United States Patent [19]
Gebhardt et al.

[11] 3,742,862
[45] July 3, 1973

[54] FLOATING ELECTROMAGNETIC SUSPENSION SYSTEM

[75] Inventors: Rudolf Gebhardt; Max Gopfert, both of Munich, Germany

[73] Assignee: Krauss-Maffei Aktiengesellschaft, Munich, Germany

[22] Filed: Aug. 18, 1971

[21] Appl. No.: 172,770

[30] Foreign Application Priority Data
Aug. 21, 1970 Germany.................. P 20 41 553.6

[52] U.S. Cl. .......................... 104/148 MS, 317/123
[51] Int. Cl.............................................. B61b 3/00
[58] Field of Search .............. 104/148 MS; 317/123; 324/45

[56] References Cited
UNITED STATES PATENTS
| | | | |
|---|---|---|---|
| 3,125,964 | 3/1964 | Silverman.................... | 104/148 MS |
| 3,609,530 | 9/1971 | Joinson........................... | 324/45 X |
| 3,596,144 | 7/1971 | Cunningham.................... | 317/123 |

FOREIGN PATENTS OR APPLICATIONS
643,316   4/1937   Germany..................... 104/148 MS Primary Examiner—Robert G. Sheridan
Assistant Examiner—George H. Libman
Attorney—Karl F. Ross

[57] ABSTRACT

A carriage traveling along a track of magnetically permeable metal is supported at one or more points by electromagnets energized by a variable current to maintain a predetermined spacing between the magnet poles and the overlying track. This sdpacing is sensed by a control circuit which comprises a magneto-electric transducer including a permanent megnet juxtaposed with a Hall-effect generator which is located in the stray field of an associated electromagnet and whose output controls the energization of the latter, the two magnets being so poled as to create a negative-feedback effect stabilizing the operation of the control circuit.

10 Claims, 3 Drawing Figures

3,742,862

Rudolf Gebhardt
Max Göpfert
INVENTORS.

BY

Karl F. Ross
Attorney

FLOATING ELECTROMAGNETIC SUSPENSION SYSTEM

Our present invention relates to a floating suspension system for a carriage to be supported without contact, via one or more electromagents, by a magnetically permeable rail or rails forming part of a track for that carriage, with the pole faces of the electromagnets maintained at a predetermined distance from a guide surface of the track.

In a floating railway of this type, e.g. as described in German Pat. Nos. 643,316 and 644,302, the energizing current for the electromagnets must be variable in order to compensate for unavoidable irregularities in the guide surface or other factors (such as wind or vibrations) which may alter the mutual separation of the magnetic pole faces and the track. As is well known, the distance between the poles and the guide surface must be such that, with the electromagnets disposed below that surface, the attraction therebetween just balances the force of gravity, i.e. the weight of the supported load; since the magnetic force diminishes with the square of distance, the slightest change in that distance—if uncompensated—would either let the load drop or draw the magnet poles upwardly into contact with the rail.

In order to eliminate this inherent instability, therefore, the excitation of each electromagnet must be instantly adapted to any variation in distance as determined by a suitable sensor. Such a compensatory change in energizing current, however, tends to lead to overcorrection resulting in a different kind of instability, i.e. an oscillatory condition which not only may damage the freight or injure the passengers but could also take the system out of the range of adjustability with ensuing complete detachment from or adhesion to the rail, as in the uncompensated case. Prior attempts to stabilize such systems generally involved complex damping circuits which, in view of the nonresonant nature of the system, had to be effective over a wide frequency band to attenuate these oscillations.

The general object of our present invention is to provide improved means in such a suspension system for stabilizing the spacing between the electromagnetic pole faces and the guide surface of the track with effective suppression of objectionable oscillations.

A more specific object is to provide simple circuitry for obtaining this result.

These objects are realized, pursuant to our invention, by the provision of a magneto-electric transducer which is mounted on a common support with an associated electromagnet and constantly monitors the distance between a pole face (or, preferably, a pair of pole faces) of the electromagnet and the associated guide surface, this transducer being disposed in the path of lines of force from the electromagnet for generating an output signal which varies in the same sense (e.g. diminishes in intensity) in response to an increase in that distance and to a decrease in the field strength of the elecromagnet. Thus, a momentary augmentation of that distance is sensed by the transducer whose output acts upon a control stage in the energizing circuit of the electromagnet to intensify the excitation thereof, thereby strengthening the force with which the magnet is attracted onto the track; part of the intensified flux also reaches the transducer to counteract the effect of the increased track distance upon its output signal. When, in view of the compensatory excitation, the track distance begins to decrease, the combined effect of reapproach and magnetic feedback acts as a brake upon the rising magnetizing current so that overcorrection is prevented. An analogous situation exists if the track distance shrinks, the partial de-energization of the electromagnet then limiting the inverse change of the transducer output signal. In each case, the relative position of the pole faces and the rail will vary only within a narrow range, this variation being readily balanced by a moderate change in amperage.

Advantageously, according to a more specific feature of our invention, the transducer comprises a Hall-effect generator interposed between the rail surface and a permanent magnet. For the reasons indicated above, this permanent magnet should be so positioned in the stray field of the electromagnet as to be aided by the flux thereof, this stray flux being only a small fraction of the flux originating from the permanent magnet and traversing the Hall-effect generator.

If the electromagnetic field changes because of a fluctuating supply voltage, the transducer responds immeadiately to re-establish equilibrium as in the case of a changing track distance discussed above.

The energizing circuit for the coil or coils of the controlled electromagnet advantageously includes an operational amplifier of the differential type connected across a source of direct current by way of a voltage divider also supplying a fraction of the source voltage to the Hall generator, the output terminals of this generator being connected in bucking relationship in that voltage divider between two taps which are tied to the input terminals of the differential amplifier. With a suitable dimensioning of this divider, any variation in supply voltage is balanced by a proportional change in the generator output so as not to influence the input voltage of the amplifier which then depends only on the magnitude of the incident magnetic field.

If the same power supply also delivers operating voltage to the differential amplifier and to one or more additional amplifier stages beyond the latter, its output voltage may have to be substantially greater than the input voltage of the Hall generator. In such case the stability of the control circuit may be increased by connecting a low-resistance reference impedance, preferably the forward path of a silicon diode, across the generator input in parallel with a part of the voltage divider which contains the taps tied to the inputs of the differential amplifier.

The invention will be described in greater detail hereinafter with reference to the accompanying drawing in which.

Figure 1:
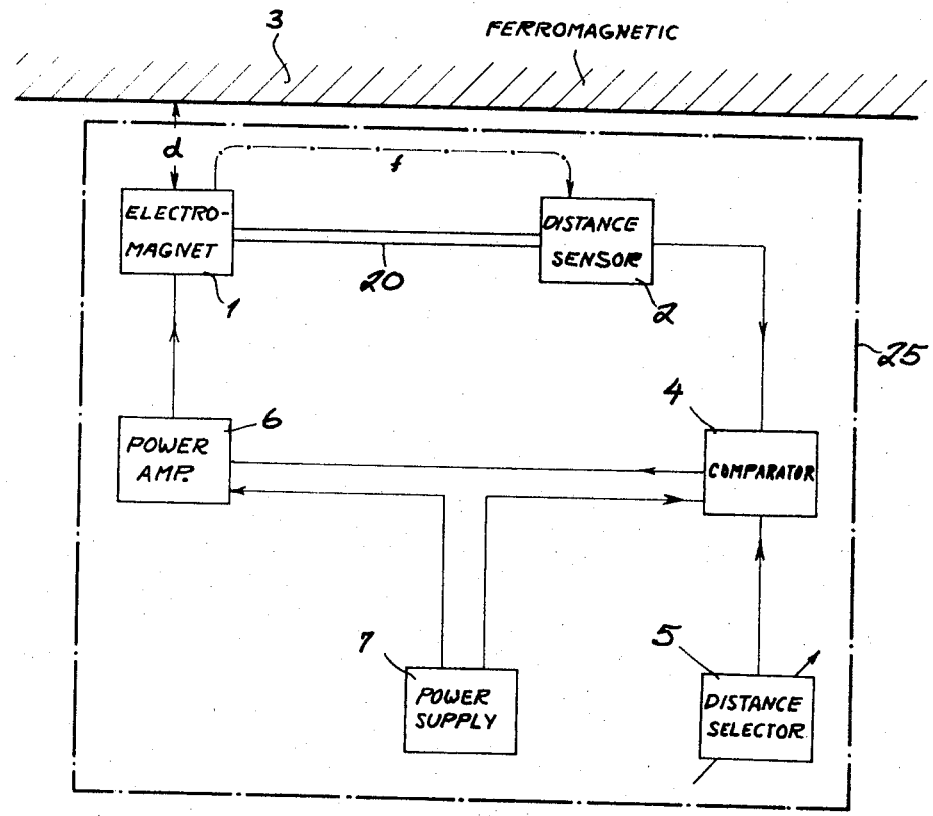
FIG. 1 is a block diagram of a circuit arrangement associated with an electromagnetic suspension system according to our invention.

In FIG. 1 we have shown, aboard a carriage diagrammatically indicated at 25, a suspension system for supporting that carriage without physical contact and therefore without friction on a rail 3 of ferromagnetic material, usually steel. Generally, the carriage will be electromagnetically suspended from the rail (or from several parallel rails) at a plurality of points, yet for present purposes the description of a single electromagnetic support will suffice. It will also be understood that the carriage and the track may be provided with ancillary means, such as wheels normally spaced above another rail not shown, to intercept the carriage in the event of power failure or other emergencies.

Figure 3:
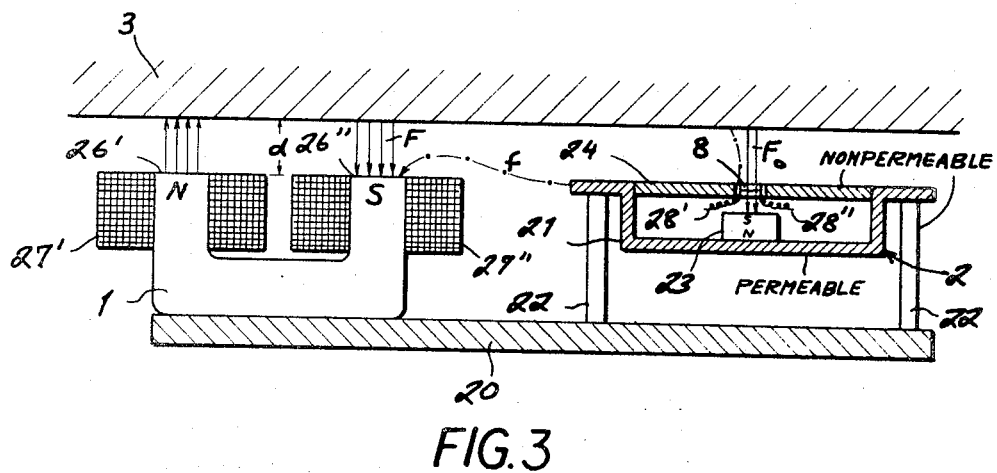
FIG. 3 is a view in sectional elevation of an electromagnet and an associated distance sensor forming part of the system of FIGS. 1 and 2.

An electromagnet 1, more fully illustrated in FIG. 3, is maintained at a predetermined distance $d$ from the underside of rail 3 by its attractive force balancing the weight of the loaded carriage or a proportional part of that weight in the presence of several such magnets. A rigid link 20, illustrated in FIG. 3 as a plate, physically connects the electromagnet 1 with a closely juxtaposed distance sensor 2 located in a path of stray electromagnetic flux $f$. Sensor 2 controls, via a comparator 4 receiving a reference signal from a manually adjustable distance selector 5, a power amplifier 6 from which issues the energizing current for electromagnet 1. A common power supply for the aforedescribed components has been shown at 7.

As seen in FIG. 3, electromagnet 1 is of the horseshoe type and has a pair of pole faces 26', 26'' at a level spaced by the distance $d$ from the lower surface of rail 3, the magnet being excited by means of two coils 27', 27'' in a manner more fully described hereinafter with reference to FIG. 2. The main magnetic flux F passes directly across the gaps separating the pole faces 26', 26'' from the rail 3. The stray flux $f$ circulates along a path which includes a cup-shaped base 21 of magnetically permeable material supported on plate 20 by means of nonpermeable struts 22, the rim of the cup being at the level of pole faces 26', 26''. Sensor 2 includes a permanent bar magnet 23 rising from the bottom of cup 21 toward a lid 24 of nonpermeable material having a central aperture which accommodates a Hall-effect generator 8 comprising a horizontal ribbon traversed by an operating current as is well known per se; the supply leads for that current have been shown at 28' and 28''.

Magnets 1 and 23 are so poled that the stray flux $f$ of the former reinforces the permanent flux $F_0$ of the latter in its passage through the Hall generator 8. Thus, the output signal of the generator is a function of the distance $d$, it being understood that the carriage is stabilized against rotation so that the spacing of magnet 23 from rail 3 is always strictly proportional to the pole distance $d$. However, since the stray flux $f$ depends on the field strength of electromagnet 1, this output signal is also influenced by that field strength and is therefore subject to a magnetic negative-feedback effect.

Figure 2:
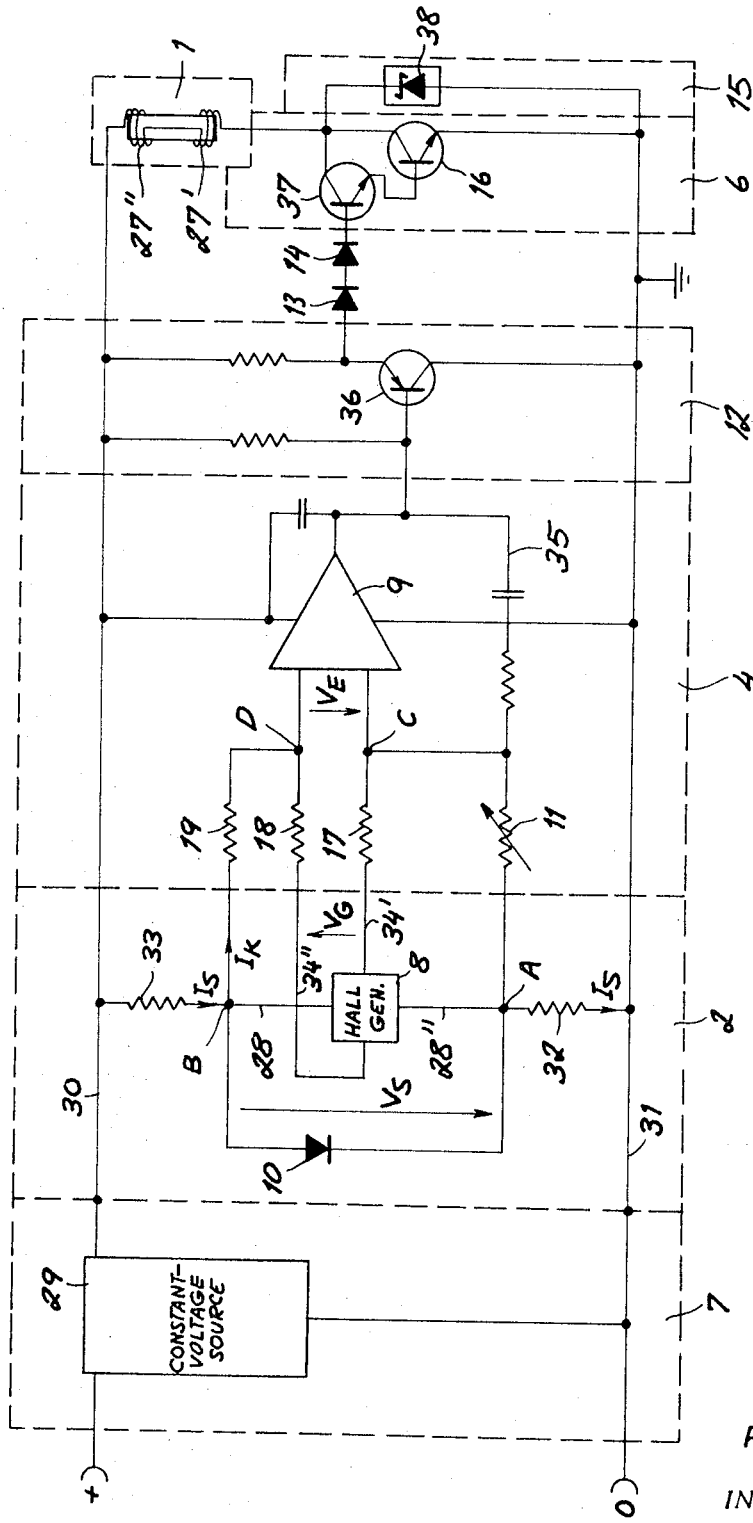
FIG. 2 is a more detailed circuit diagram of the system of FIG. 1.

Reference will now be made to FIG. 2 showing details of the stages 2, 4, 6, 7 diagrammatically illustrated in FIG. 1.

Power supply 7 comprises a constant-voltage source 29 of conventional type working into a positive bus bar 30 and a grounded negative bus bar 31. Connected across these bus bars is a voltage divider including two substantially symmetrical branches respectively consisting of series resistors 32, 11, 17 and series resistors 18, 19, 33. One of the divider sections, here the resistor 11, is adjustable to vary the pole distance $d$ of FIGS. 1 and 3, forming thus part of the distance selector 5 shown in FIG. 1.

The input leads 28'', 28' of Hall generator 8 are shown connected to points A and B of the divider, i.e. to the junctions of resistors 32, 11 and 19, 33. Between these junctions we insert a silicon diode 10 whose forward resistance shunts the Hall generator 8 and maintains a small but definite potential difference $V_S$ thereacross. The output signal of the generator, taken off at suitably chosen points along its ribbon, is a voltage $V_G$ appearing across a pair of leads 34', 34'' which are connected to the free ends of resistors 17 and 18, respectively. This voltage $V_G$ opposes the voltage drop generated by the portion $I_K$ of the supply current $I_S$ traversing the resistors 11, 17 and 18, 19, thereby giving rise to a control voltage $V_E$ across taps C, D at the junctions of these resistors which are bracketed by the more outlying junction points A, B. Control voltage $V_E$ is applied to the additive and subtractive input electrodes of a differential amplifier 9 having the usual negative-feedback loop 35, this feedback being virtually without effect upon the operation of the magneto-mechanical system with its relatively large time constant. Hall generator 8, whose output voltage may vary with ambient temperature at a rate of, say, 2 percent per °C, is maintained by the diode 10 and the voltage divider in an optimum operating range.

Amplifier 9 works into an impedance transformer 12, including an NPN transistor 36, which in turn feeds the power amplifier 6 shown to comprise a pair of NPN transistor stages 37, 16. The slight voltage drop present across transistor 36 in its saturated stage is compensated by the forward resistance of two cascaded diodes 13, 14, thereby enabling complete de-energization of the winding 27', 27'' inserted in the collector lead of output transistor 16. A protective stage 15 includes a Zener diode 38 bridged across the transistor 16; Zener diode 38 serves as a shunt path for transients coming into existence when the transistor 16 is cut off.

The total gain of the several amplifier stages 9, 36, 37, 16 may be on the order of $10^6$. It should be noted that, aside from the feedback loop 35 serving to suppress inherent noise, the system includes no differentiators, integrators or other reactive networks so that the output signal $V_G$ is translated practically without distortion into a corresponding increment of magnetizing current. The system is simple in its construction and dependable in its operation.

The carriage 25 may form part of a train of such carriages coupled, e.g. electromagnetically, with any suitable prime mover displaceable along track 3.

We claim:

1. A floating carriage-suspension system comprising:

magnetically permeable rail means provided with a guide surface;

support means on a carriage movable along said rail means, said support means including an electromagnet with a pole face spaced from said guide surface and an energizing circuit for said electromagnet;

sensing means on said support means for monitoring the distance of said pole face from said guide surface, said sensing means including a magneto-electric transducer disposed in the path of lines of force from said electromagnet for generating an output signal varying in the same sense in response to an increase in said distance and to a decrease in the field strength of said electromagnet; and control means in said energizing circuit responsive to said output signal for modifying the energization of said electromagnet to compensate for variations in said distance and said field strength, with negative magnetic feedback between said electromagnet and said sensing means.

2. A system as defined in claim 1 wherein said transducer comprises a permanent magnet in aiding relationship with the lines of force from said electromagnet and a Hall-effect generator interposed between said permanent magnet and said rail means.

3. A system as defined in claim 2 wherein said energizing circuit comprises a source of direct current, said control means including a voltage divider connected across said source in bucking relationship with a pair of output terminals of said Hall-effect generator.

4. A system as defined in claim 3 wherein said energizing circuit further comprises a differential amplifier with input terminals connected across taps of said voltage divider on opposite sides of said output terminals.

5. A system as defined in claim 4 wherein said Hall-effect generator has input leads connected across said source at junctions with said voltage divider bracketing said taps.

6. A system as defined in claim 5, further comprising a low-resistance reference impedance connected across said junctions.

7. A system as defined in claim 6 wherein said reference impedance comprises the forward resistance of a silicon diode.

8. A system as defined in claim 5 wherein sections of said voltage divider between said junctions, said taps and said output terminals are proportioned to maintain a voltage across said input terminals substantially independent of the source voltage.

9. A system as defined in claim 2 wherein said transducer comprises a magnetically permeable base for said permanent magnet disposed substantially at the level of said pole face.

10. A system as defined in claim 9 wherein said transducer and said electromagnet are mounted alongside each other beneath said guide surface.

* * * * *